United States Patent [19]

Kunert

[11] Patent Number: 5,092,101
[45] Date of Patent: Mar. 3, 1992

[54] WALL ELEMENTS

[76] Inventor: Heinz Kunert, Am Krielerdom 23, D-5000 Cologne 41, Fed. Rep. of Germany

[21] Appl. No.: 567,247

[22] Filed: Aug. 14, 1990

Related U.S. Application Data

[63] Continuation-in-part of Ser. No. 506,507, Apr. 2, 1990, abandoned, which is a continuation of Ser. No. 45,070, May 1, 1987, abandoned.

[30] Foreign Application Priority Data

May 2, 1986 [DE] Fed. Rep. of Germany ....... 3614978

[51] Int. Cl.$^5$ .......................... E04C 1/42; E04C 2/54
[52] U.S. Cl. ...................... 52/789; 52/308; 52/207; 156/100
[58] Field of Search ................ 52/171, 172, 306–308, 52/789, 207; 156/109, 99–102

[56] References Cited

U.S. PATENT DOCUMENTS

| | | | |
|---|---|---|---|
| 1,176,313 | 3/1916 | Pfund | 156/100 |
| 1,748,080 | 2/1930 | Reece | 156/101 |
| 1,842,324 | 1/1932 | Griffith | 156/101 |
| 1,966,833 | 7/1934 | Sherts | 156/100 |
| 2,221,649 | 11/1940 | Mulford | 52/307 |
| 2,264,190 | 11/1941 | Sherts et al. | 156/101 |
| 2,665,610 | 1/1954 | Harrison | 52/307 |
| 2,714,816 | 8/1955 | Pennell | 52/316 |
| 2,893,962 | 7/1959 | Bartell | 428/304.4 |
| 3,351,518 | 11/1967 | Ryan | 156/100 |
| 3,956,559 | 5/1976 | Wildorf | 428/214 |
| 3,985,116 | 10/1976 | Kapany | 52/792 |
| 4,041,663 | 8/1977 | Mazzoni | 52/788 |
| 4,198,796 | 4/1980 | Foster | 52/203 |
| 4,235,048 | 11/1980 | Gillery | 52/789 |
| 4,268,531 | 5/1981 | De Boel | 428/428 |
| 4,327,065 | 4/1982 | Dardel et al. | 126/417 |
| 4,335,166 | 6/1982 | Lizardo et al. | 52/789 |
| 4,402,927 | 9/1983 | Dardel et al. | 423/335 |
| 4,531,511 | 7/1985 | Hochberg | 126/417 |
| 4,596,237 | 6/1986 | Melchior et al. | 52/306 |
| 4,610,863 | 9/1986 | Tewari et al. | 423/336 |
| 4,684,571 | 8/1987 | Kunert et al. | 428/319.1 |
| 4,687,687 | 8/1987 | Terneu et al. | 52/171 |

FOREIGN PATENT DOCUMENTS 1390528  1/1965  France .................. 52/306

Primary Examiner—James L. Ridgill, Jr.
Attorney, Agent, or Firm—Collard, Roe & Galgano

[57] ABSTRACT

A wall or window element and/or wall element beneath the window is provided having an insulation layer disposed between two panels. The insulation layer is formed of a material which reduces convective heat transfer and thermal radiation. The insulation layer and the panels are permeable by the solar radiation spectrum, and the external panel which bounds the insulation layer on the side of the solar radiation is an absorptive pane which has a maximally high absorptivity for the non-visible portion of the solar radiation spectrum.

15 Claims, 4 Drawing Sheets

WALL ELEMENTS

This is a continuation-in-part of copending application Ser. No. 07/506,507 filed on Apr. 2, 1990 which is a continuation of copending application Ser. No. 07/045,070 filed May 1, 1987 both now abandoned.

The present invention relates to a wall, window and/or wall portion beneath a window element consisting of an insulation layer disposed between two panels or the like, the insulation layer being comprised of a material which reduces convective heat transfer and radiant heat. The insulating layer and the panels are comprised of a material which is permeable by the solar radiation spectrum.

A wall element of the type with which the present invention is concerned is disclosed in German patent document 29 06 259. This document relates to a light-permeable wall element with sufficient strength for a wall and which is comprised of two covering panels of transparent or translucent material, namely plastic, and a filler disposed between them, which is also comprised of transparent or translucent material, namely plastic. Incident, generally direct sunlight is multiply reflected by the filler, and enters the interior space as scattered light or as non-glaring, diffuse light.

Such wall elements, however, have the disadvantage of poor temperature stability. The incident solar radiation is partially absorbed by the multiple reflections as it passes through the intermediate or insulating layer, because the reflection is not loss-free. Furthermore, the materials used are not completely permeable to the solar radiation, particularly in the ultraviolet and infrared regions of the solar spectrum. Thus, intense incident solar radiation which becomes absorbed, high ambient temperatures, and reverse radiation from the interior space can result in temperatures greater than 100° C. in the insulating layer. Over a period of time the material of the insulating layer becomes brittle and deterioration of the shape of the wall element results. Localized heating situations can also result in failure of the cover panels.

The object of the present invention is to provide a wall or window element of the type described above wherein the insulating layer is effectively protected against excessive heating by solar radiation, and the disadvantages mentioned above are therefore overcome, while at the same time certain convective heat transfer and radiant heat into the interior space resulting from the solar energy incident on the wall element are reduced.

The above object is accomplished according to the present invention, wherein excessive heating of the insulation layer is avoided, by the selective reduction of the incident solar radiation. This reduction is accomplished by a filter pane disposed in front of the insulation layer, which selectively passes the visible range of solar radiation and may, if desired, have high transmissivity for this range, while at the same time being highly absorbent of the ultraviolet and near infrared portions of the solar spectrum.

Although a reflecting filter provides more effective heat protection for the insulation layer, by directly reflecting ultraviolet and infrared radiation, and is possibly also more economical, a filter pane or panel, which acts primarily by absorption, is preferred in accordance with the present invention. The appearance of panes with a reflective coating is aesthetically unattractive, due to colored irridescence. Such panes act as radiation mirrors, and are therefore environmentally harmful because of their directional reflected radiation, which causes harm to vegetation and produces glare. In addition, it is generally not permissible to install such panes in large building facades, where directed reflected light from such panes can strike neighboring buildings.

In an article, "Solar reflecting glass for building construction" in the German technical journal Architektur & Wohnwelt, June 1975, p. 430, the use of absorptive glass in double-pane windows is described.

According to the article, absorptive glass panels colored en masse, absorb the non-transmitted fraction of incident solar radiation. This energy absorption leads to heating of the exposed panels. By convection and by emission of long-wave radiation, the energy fraction which has been absorbed is then transmitted as heat to the exterior and to the interior space. In air conditioned buildings, however, it is often uneconomical to employ absorptive panels such as described in detail in the article mentioned, because an additional burden is placed on the conditioned air of the interior space due to the need to cool the heated panels. The heat energy given off is largely to the interior space, which is generally undesirable.

There is nothing in the Architektur & Wohnwelt article to enable the reader to determine whether absorptive panels can be used successfully in conjunction with double glass windows.

In German patent document 29 06 259, the underlying problem sought to be corrected by the invention therein is quite different from that posed herein. Therefore, this German patent document also gives no hint that convective and radiative heat transfer to the indoor space, of solar energy incident on the wall element, can be reduced by disposing an absorptive panel in front of the insulating layer.

An absorptive filter pane according to the present invention may be, for example, a glass sheet having a colored core. Such sheets absorb more than 50% of the incident radiated solar energy, while transmitting about 80% of the light radiation. In this manner, the solar radiated energy reaching the insulating layer can be approximately halved, which would be sufficient for the purpose at hand.

In order to avoid overheating of the absorptive filter pane by the absorbed solar energy, and to ensure that the thermal energy is not transmitted to the insulating layer but to the ambient or external air, various additional features may be provided for. Thus, it is advantageous if so-called "low-E" coatings having low emissivity in the infrared range are applied to the interior side, that side facing the insulating layer, of the pane exposed to the solar radiation. These may be, for example, metal oxide coatings. In this way the thermal radiation from the external pane to the insulating layer is suppressed.

It is further advantageous if the inventive wall elements are mounted so as to be pivotable or rotatable through 180° about a middle or side axis, so that the exterior side can be turned inward, and vice versa. This enables particularly advantageous effects relating to climate control economy when the subject elements are used in buildings, because in the one case the heat radiation from the exterior to the interior is suppressed, and in the other case the heat radiation from the interior to the exterior is suppressed.

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

Figure 1:
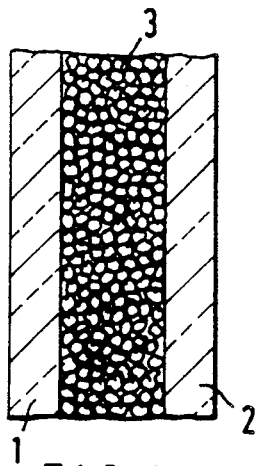
FIG. 1 is a cross-sectional view of a wall element according to the present invention.

Now turning to the drawings, there is shown in FIG. 1 the simplest form of a wall element according to the present invention. The wall element is comprised of an external pane 1 and an internal pane 2 comprised of a light-permeable organic or inorganic material, and a translucent insulation layer 3 disposed therebetween. Insulation layer 3 has a high insulation valve and may consist of a filler of silica aerogel pellets.

Pane 1, while being transmissive of the visible portion, is much more absorptive of the ultraviolet and infrared portions of solar radiation than is pane 2. The absorptive substances are uniformly distributed through the entire thickness of pane 1 which will hereinafter be referred to as the "absorptive pane". Pane 2 has the maximum possible transmissivity for the entire range of solar radiation.

Figure 2:
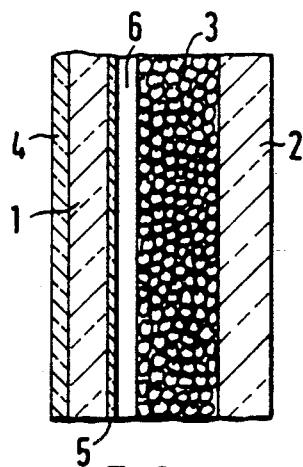
FIG. 2 is a view similar to FIG. 1 showing a modification thereof.

In FIG. 2 there is shown a wall element wherein the absorptive properties of absorptive pane 1 are present only on its outer layer, which is provided with a coating 4. Absorptive pane 1 may also be a so-called "cased glass", which is a colorless glass to which a layer 4 of colored, selectively absorbing glass has been fused. Layer 4 in this case is colored in its core. Absorptive pane 1 may also be a laminated glass wherein an absorptive sheet is bonded to a colorless glass sheet by means of an adhesive film or the like.

On its internal side facing insulation layer 3, absorptive pane 1 has a low-E (emissivity) coating 5. This coating is maximally transparent for the visible range, but has minimal emissivity for the far infrared range. Insulation layer 3 may be a translucent foam material. An air gap 6 is provided between absorptive pane 1 and insulation layer 3. This gap is required for low-E coating 5 to be effective.

Figure 3:
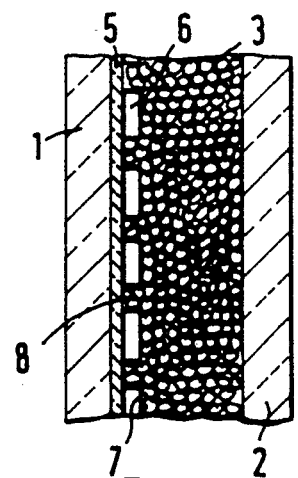
FIG. 3 is a view similar to FIG. 1 showing yet another modification thereof.

In the embodiment shown in FIG. 3, the side of insulation layer 3 which faces absorptive pane 1 is provided with a three-dimensionally structured surface 7 with projections 8 adhesively bonded to the absorptive pane. Projections 8 define a plurality of air spaces 6 therebetween. The rear side of insulation layer 3 is adhesively bonded directly to pane 2. Projections 8 form at most 20% of the surface area of insulation layer 3.

Figure 4:
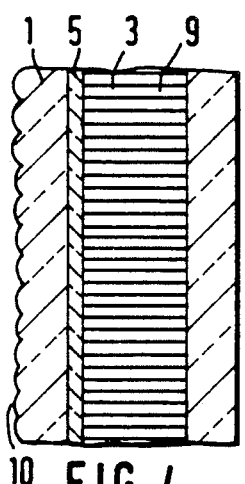
FIG. 4 is a view similar to FIG. 1 showing yet another modification thereof.

In the embodiment shown in FIG. 4, insulation layer 3 is comprised of a translucent capillary plate 9 wherein hollow, thin-walled tubular structures extend perpendicularly to and between panes 1 and 2. The tubular structures of capillary plate 9 are open toward absorptive pane 1, so that low-E coating 5 is contacted only by the thin edges of the walls of the tubular structures, which have adequately sized air gaps between them. As can also be clearly seen in FIG. 4, the external face of absorptive pane 1 has a sculptured surface 10, providing increased surface area. Surface 10 may be comprised of one or more various geometric shapes, e.g. it may be knurled or the like.

Figure 5:
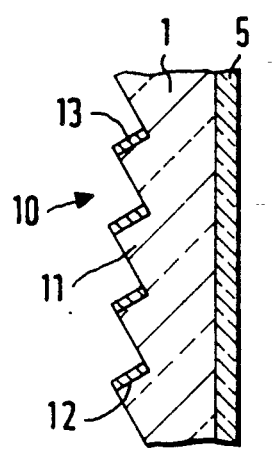
FIG. 5 is an enlarged detailed view of a portion of the wall element of FIG. 4.

FIG. 5 is an enlarged view of a detail of the absorptive pane of FIG. 4. Outer surface 10 has a significantly increased surface area which serves to improve removal of the heat resulting from the radiation absorbed in absorptive pane 1. This surface with increased area may be comprised of regularly disposed hemispheres or horizontal cylindrical prominences (as in FIG. 4). According to the embodiment shown in FIG. 5, horizontally disposed prisms 11 having a V-shaped cross section are provided. The internal lateral surfaces 12 are generally directed toward or perpendicular to the incident solar radiation. Advantageously, they are provided with a coating 13 which may comprise a strongly absorptive material and which may also have reflective properties.

Figure 6:
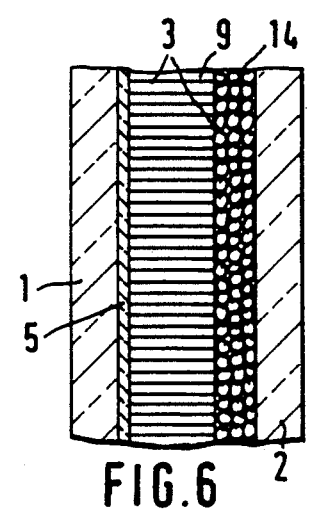
FIG. 6 is a view similar to FIG. 1 showing yet another modification thereof.

In FIG. 6 there is shown an embodiment wherein insulation layer 3 is comprised of a combination of a tubular structure 9 and silica aerogel pellets 14.

Figure 7:
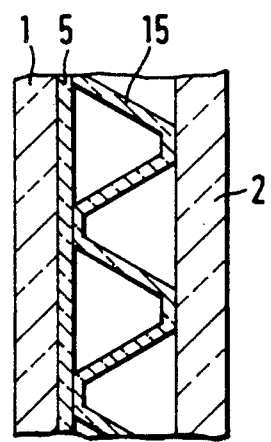
FIG. 7 is a view similar to FIG. 1 showing yet another modification thereof.

As clearly seen in FIG. 7, insulation layer 3 may be comprised of a deep drawn, regular, three-dimensionally structured, highly transparent film or sheet 15 which is adhesively bonded to the two panes 1 and 2.

Figure 8:
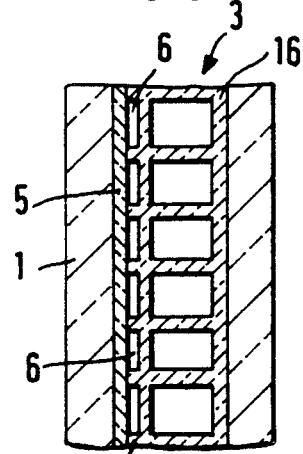
FIG. 8 is a view similar to FIG. 1 showing yet another modification thereof.

In FIG. 8 there is illustrated an embodiment similar to that shown in FIG. 7 wherein insulation layer 3 is in the form of a plate 16 with hollow chambers. To provide the necessary air gap 6 between plate 16 and absorptive pane 1, the insulating layer 3 has projections 17 which are adhesively bonded to absorptive pane 1. Insulation layer 3 is adhesively bonded directly to pane 2, without an air gap.

Figure 9:
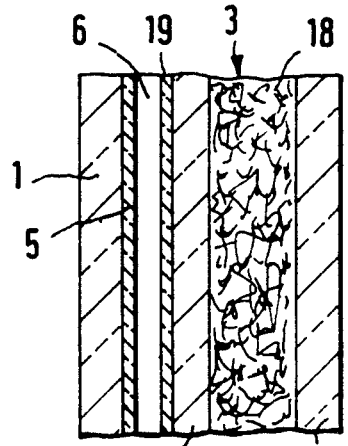
FIG. 9 is a view similar to FIG. 1 showing yet another modification thereof.

In FIG. 9 there is shown an embodiment wherein insulation layer 3 is comprised of a structured inorganic or organic fiber fabric or felt 18 and a colorless glass sheet 20 on the side facing absorptive pane 1, which sheet 20 has a low-E layer 19 on its surface. Sheet 20 is spatially mounted from absorptive pane 1.

Figure 10:
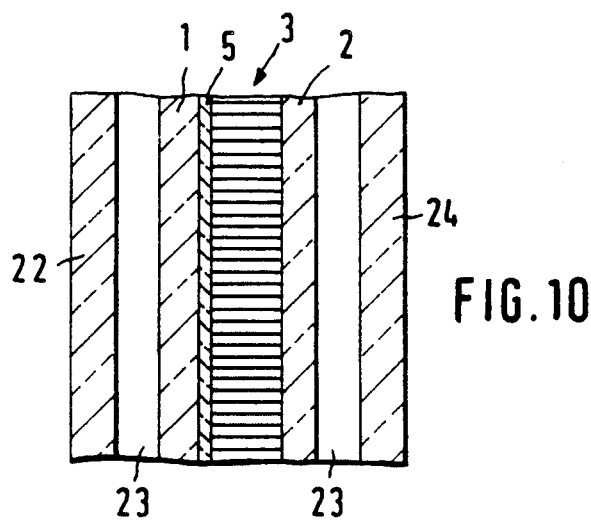
FIG. 10 is a view similar to FIG. 1 showing yet another modification thereof.

In FIG. 10 there is shown an embodiment wherein a wall element, such as is illustrated in FIGS. 1-8, is disposed between two additional colorless glass sheets 22 and 24 and spatially separated by a distance 23 from each, such that the element can be reversed therein.

Figure 11:
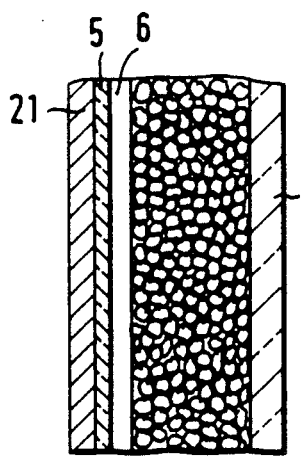
FIG. 11 is a view similar to FIG. 1 showing yet another modification thereof.

In the embodiment shown in FIG. 11, absorptive pane 21 is not comprised of translucent or partially transparent material, but rather of opaque material, e.g.

a metal sheet or a ceramic material. This absorptive pane 21 has a low-E layer 5 on its internal side and is mounted with an air gap 6 between it and insulation layer 3. The material used for the low-E layer is advantageously one which absorbs incident solar radiation over the entire spectrum but which reduces secondary radiation, i.e. re-radiation of heat.

Figure 12:
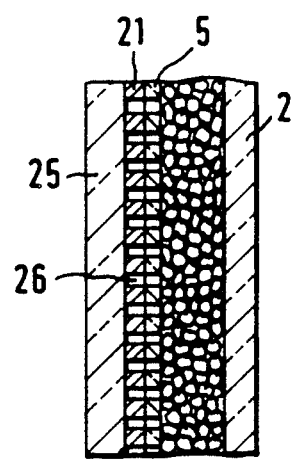
FIG. 12 is a view similar to FIG. 1 showing yet another modification thereof.

In FIG. 12 there is illustrated a refinement of the embodiment of FIG. 11. Here, absorptive pane 21 is comprised of a panel of opaque material having holes or other openings 26 distributed regularly over its surface. A transparent or translucent colorless glass sheet 25 is placed in front of pane 21 to protect against corrosion.

Figure 13:
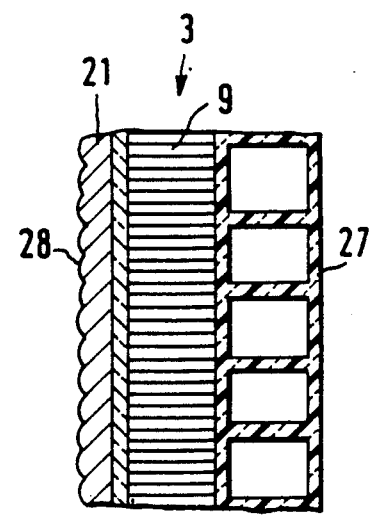
FIG. 13 is a view similar to FIG. 1 showing yet another modification thereof.

In FIG. 13 there is shown an embodiment wherein absorptive pane 21 is comprised of an opaque panel the external surface 28 of which has an increased surface area provided by three-dimensional structures. The internal panel comprises a transparent plastic webbed double plate 27 which is adhesively bonded to insulation layer 3 comprised of a capillary structure plate 9. The surface 28 with increased surface area promotes better heat removal to the ambient or external surroundings.

Figure 14:
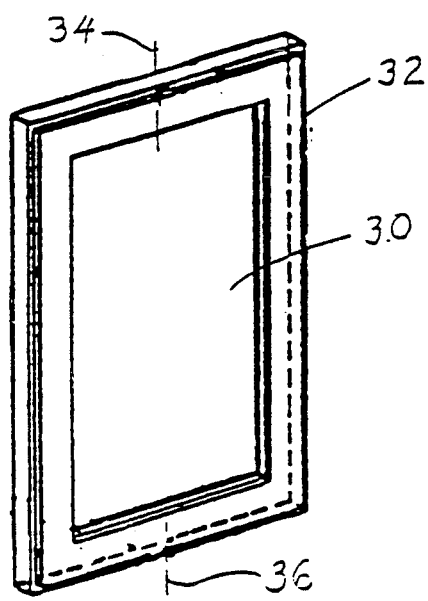
FIG. 14 is a perspective view of a window and frame combination according to the present invention.
Figure 15:
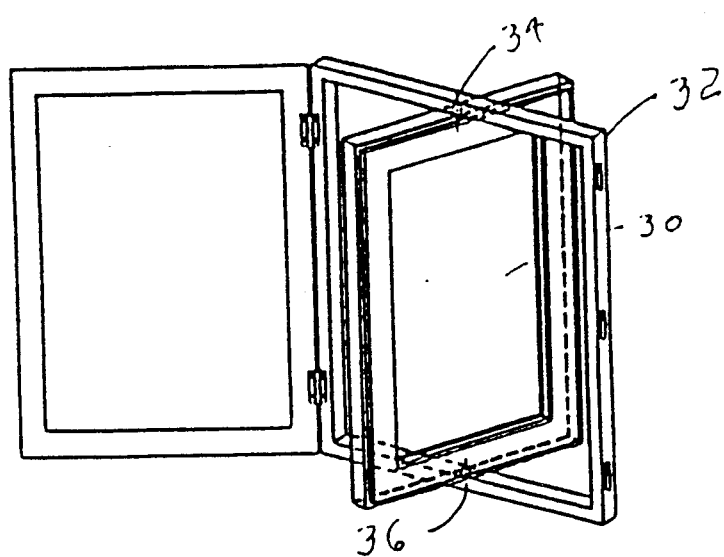
FIG. 15 is a perspective view of the window and frame combination of FIG. 14 after having been rotated into the open position from the closed position of FIG. 14.

Advantageously, all the thermal wall elements shown, with the exception of that of FIG. 10, can be mounted as a window in a frame 32 to permit 180° rotation thereof about pivots 34 and 36, as clearly seen in FIG. 14. Depending on the time of year, the wall elements can be faced in a direction wherein they are employed in an economically advantageous manner. Thus, they may be used in known fashion, to provide the indoor spaces delimited by them with protection from the effects of external solar heat or with prevention of heat loss from the internal spaces. In this way the solar radiation energy can be used for supplementary heating in winter.

While several embodiments of the present invention have been shown and described, it will be obvious that many changes and modifications may be made thereunto without departing from the spirit and scope of the invention.

What is claimed is:

1. A wall or window element comprising:
   (a) a thermal insulation layer consisting of a three dimensional thin wall structure having a low capacity for transmission of convective heat and thermal radiation and being highly transmissive to the solar radiation spectrum;
   (b) a first pane colored to its core bounding said insulation layer on a first side thereof and said first pane being an absorptive pane consisting of a material that is highly absorptive of the non-visible portions, infrared and ultraviolet range, of the solar radiation spectrum while being substantially transmissive to the visible portion of the solar radiation spectrum having substantially no reflection properties with respect to solar radiation beyond those which are inherent in untreated material;
   (c) said absorptive pane having on its internal side facing said insulating layer, a layer which impedes emission of heat radiation;
   (d) a space being provided between said internal side of said absorptive pane facing the insulation layer and the insulation layer;
   (e) a second pane bounding said insulation layer on a second side thereof opposite said first side and formed of a material which is transmissive to the entire solar radiation spectrum; and
   (f) means for pivotally mounting said entire element in a frame so as to be rotatable through 180°.

2. The wall or window element according to claim 1, wherein said insulation layer is comprised of a translucent plastic foam structure.

3. The wall or window element according to claim 1, wherein said insulation layer is comprised of translucent plates having a capillary structure.

4. The wall or window element according to claim 1, wherein said insulation layer is comprised of translucent plastic panels having a hollow chamber structure.

5. The wall or window element according to claim 1, wherein said insulation layer is comprised of silica aerogel material.

6. The wall or window element according to claim 1, wherein said insulation layer is comprised of translucent fibrous panels of organic or inorganic material.

7. The wall or window element according to claim 1, wherein said insulation layer is comprised of at least one transparent or translucent plane parallel foil or sheet of organic or inorganic material.

8. A wall or window element according to claim 1, wherein said absorptive pane is a colored glass sheet.

9. A wall or window element according to claim 1, wherein said absorptive pane comprises a laminated glass of a colored glass sheet bonded to a clear glass sheet by means of an adhesive film.

10. A wall or window element according to claim 1, wherein said absorptive pane comprises a glass sheet covered on its internal side facing said insulation layer with a layer of opaque material having openings or the like distributed over its surface.

11. The wall or window element according to claim 1, wherein said absorptive pane has an increased surface area on its external side, provided by means of relief-like projections on the surface thereof.

12. The wall or window element according to claim 11, wherein said relief-like projections of the absorptive pane comprise uniformly distributed hemispheres.

13. The wall or window element according to claim 11, wherein said relief-like projections of the absorptive pane comprise horizontally disposed prominences, each having a semicylindrical cross section.

14. A wall or window element comprising:
   (a) a thermal insulation layer consisting of a three dimensional thin wall structure having a low capacity for transmission of convective heat and thermal radiation and being highly transmissive to the solar radiation spectrum;
   (b) a first pane colored to its core bounding said insulation layer on a first side thereof and said first pane being an absorptive pane consisting of a material that is highly absorptive of the non-visible portions, infrared and ultraviolet range, of the solar radiation spectrum while being substantially transmissive to the visible portion of the solar radiation spectrum having substantially no reflection properties with respect to solar radiation beyond those which are inherent in untreated material;
   (c) said absorptive pane has, on its internal side facing said insulating layer, a layer which impedes emission of heat radiation;
   (d) a space being provided between the internal side of the absorptive pane facing said insulation layer and the insulation layer;
   (e) a second pane bounding said insulation layer on a second side thereof opposite said first side and formed of a material which is transmissive to the entire solar radiation spectrum; and
(f) means for pivotally mounting said element in a frame so as to be rotatable through 180° and wherein said absorptive pane comprises a laminated glass of a colored glass sheet bonded to a clear glass sheet by means of an adhesive film.

15. A wall or window element comprising:
(a) a thermal insulation layer consisting of a three dimensional thin wall structure having a low capacity for transmission of convective heat and thermal radiation and being highly transmissive to the solar radiation spectrum;
(b) a first pane colored to its core bounding said insulation layer on a first side thereof and said first pane being an absorptive pane consisting of a material that is highly absorptive of the non-visible portions, infrared and ultraviolet range, of the solar radiation spectrum while being substantially transmissive to the visible portion of the solar radiation spectrum having substantially no reflection properties with respect to solar radiation beyond those which are inherent in untreated material;
(c) said absorptive pane has, on its internal said facing the insulating layer, a layer which impedes emission of heat radiation;
(d) a space being provided between said internal side of said absorptive pane facing the insulation layer and said insulation layer;
(e) a second pane bounding said insulation layer on a second side thereof opposite said first side and formed of a material which is transmissive to the entire solar radiation spectrum; and
(f) means for pivotally mounting said element in a frame so as to be rotatable through 180°, said absorptive pane comprising a glass sheet covered on its internal side facing said insulation layer with a layer of opaque material having openings or the like distributed over its surface.

* * * * *